3,000,961
TRIALKYLBORANE PROCESS
Elmer H. Dobratz, Pittsburgh, Pa., assignor to Koppers
Company, Inc., a corporation of Delaware
No Drawing. Filed Dec. 16, 1958, Ser. No. 780,659
12 Claims. (Cl. 260—606.5)

This invention relates to a method of making organoboron compounds. In one specific aspect, it relates to a novel method of making trialkylboranes.

Trialkylboranes are well known. These interesting compounds are useful as components in high energy fuels and as catalysts in the preparation of high polymers, e.g. high density polyethylene. Because of the increased emphasis placed on the development of new and better rocket fuels, workers in the field have anxiously sought inexpensive and efficient ways to make trialkylboranes.

It has been suggested that trialkylboranes can be prepared by reacting equimolecular amounts of trialkylaluminum and boron trifluoride in a pressurized vessel. The yields obtained are quite good but, unfortunately, the equipment costs involved make commercial production by this method economically unattractive. Boron trifluoride is a toxic gas having an extremely low boiling point ($-101°$ C.). Because of its low boiling point, in addition to acquiring high pressure storage cylinders, it has a low solubility in most liquids. In the preparation of trialkylboranes this solubility problem can be overcome only by resorting to the use of high pressures during the reaction. The reaction of boron trifluoride and trialkylaluminum has been conducted in the absence of pressure, but only low yields of trialkylborane are obtained. German Patent No. 1,028,576 reports an attempt to prepare trialkylboranes by the reaction of boron trichloride and trialkylaluminum. By this method, in the presence of excess trialkylaluminum, there is obtained a crude mixture of trialkylborane, alkylaluminum chlorides, and aluminum chloride. The separation problem involved is tedious because of the large quantities of aluminum chloride complexed with, or in solution with, the trialkylborane and, at most, 40 to 50% yields of trialkylborane are obtained. If an excess of the boron trichloride is used, the resulting product is a mixture of alkylboron chlorides and aluminum chloride. When preparing the trialkylboranes by either of these known methods it is very difficult, if not possible, to remove the residual traces of halogen from the product. The presence of halogen, even in very small amounts, markedly diminishes the utility of the trialkylboranes for the preparation of fuels, especially for the preparation of those fuels wherein trialkylboranes are reacted with diborane. After reviewing the difficult problems faced by prior workers, the German patentee discloses a process involving conducting the boron trichloride-trialkylaluminum reaction in the presence of an alkali metal chloride, which complexes chemically with the aluminum chloride and alkylaluminum chlorides formed during the course of the reaction. Excellent yields of trialkylborane are obtained by this method.

Quite surprisingly, I have found that boron trichloride can be reacted under carefully controlled conditions with an alkylaluminum compound at atmospheric pressure and without the adidtion of a complexing agent to produce in high yield the desired trialkylboranes. My process shows considerable advantage over that of the German patentee in that the valuable Friedel-Crafts catalyst, aluminum chloride, is obtained as a by-product in almost quantitative yields. The aluminum chloride thus obtained is substantially pure. Furthermore, by my process I am able to obtain 85 to 95% yields of substantially halide-free trialkylborane.

In my copending application, S.N. 717,542, filed February 26, 1958, I disclosed and claimed a method of making trialkylboranes involving the reaction of trialkylaluminum and trialkylborates. That process provides excellent yields of the tri(lower)alkylboranes, but the possible length of the alkyl chain of the trialkylborane is somewhat limited by the boiling point relationship between the reactant trialkylborate and the product trialkylborane. The process of the present invention shows advantage over that process in that the length of the alkyl chain obtainable by the present method depends almost solely on the availability of the reactant alkylaluminum compound.

It is, therefore, an object of the present invention to provide an improved method for the synthesis of trialkylboranes.

In accordance with the invention trialkylboranes are prepared by adding boron trichloride to at least about a stoichiometric quantity of trialkylaluminun chloride in the presence of an anhydrous aliphatic hydrocarbon solvent. After the addition of the boron trichloride is complete, the reaction mixture is heated at an elevated temperature below the melting point of the aluminum chloride formed during the course of the reacticon to effect precipitation of at least about 95% of the aluminum chloride. The precipitated aluminum chloride is thereafter easily separated by filtration. The trialkylborane remaining in the filtrate is still contaminated with a very minor portion of aluminum chloride. If desired, substantially halogen-free trialkylborane is recovered by washing out the residual aluminum chloride with water and subsequently recovering the trialkylborane by distillation or, alternatively, by contacting the residual aluminum chloride in the filtrate with up to about 5% trialkylaluminum based upon the amount of product trialkylborane. The small amount of alkylaluminum chlorides thus formed is easily separated from the trialkylborane by distillation, and can be recovered, and if desired, used in preparing additional trialkylborane.

The starting materials, the aluminum alkyls and the boron trichloride, are commercially available. The reactant alkylaluminum compound used in the invention is a member selected from the group consisting of trialkylaluminum, dialkylaluminum chloride and alkylaluminum dichloride. Thus it has the general formula:

$$R_nAlCl_{3-n}$$

wherein R is alkyl, and  is an integer having a value of at least one and not more than 3. There is no theoretical limit as to the length of the alkyl chain on the reactant alkylaluminum used in my process. As a practical matter, the only limitation imposed upon the chain length of the alkyl groups is the availability of the starting alklyaluminum. Certain recently developed processes provide an economical method for preparing alkylaluminum compounds wherein the alkyl group contains from 1 to 20 carbon atoms. If trialkylaluminum is used as a reactant, the reaction proceeds stepwise according to the following equations:

(1) 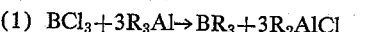 $BCl_3 + 3R_3Al \rightarrow BR_3 + 3R_2AlCl$ (2) 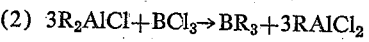 $3R_2AlCl + BCl_3 \rightarrow BR_3 + 3RAlCl_2$ (3)  $3RAlCl_2 + BCl_3 \rightarrow BR_3 + 3AlCl_3\downarrow$ the over-all reaction being:

(4) 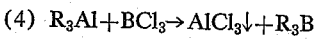 $R_3Al + BCl_3 \rightarrow AlCl_3\downarrow + R_3B$

Since the alklyaluminum dichloride and dialkylaluminum chloride are formed as intermediates when trialkylaluminum is used as a reactant, they are also useful as starting materials for purposes of the invention. Trialkylalu- 9. A steroid of the general formula

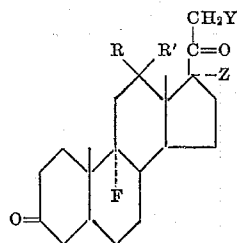

wherein individually R is hydrogen, R' is selected from the group consisting of β-hydroxy and β-acyloxy, and together R and R' is keto, Y is selected from the group consisting of hydrogen, hydroxy and acyloxy, and Z is selected from the group consisting of hydrogen and α-hydroxy.

10. A process for preparing a steroid of the general formula

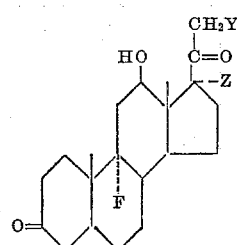

wherein Y is selected from the group consisting of hydrogen, hydroxy and acyloxy, and Z is selected from the group consisting of hydrogen and α-hydroxy, which comprises interacting a steroid of the general formula

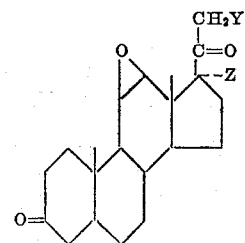

wherein Y and Z are as above defined, with hydrogen fluoride and recovering the 9α-fluoro-12β-hydroxy steroid formed.

11. A process for preparing 9α-fluoropregnane-12β-ol-3,20-dione, which comprises interacting 11β,12β-epoxypregnane-3,20-dione with hydrogen fluoride and recovering the 9α-fluoro-12β-hydroxy steroid formed.

12. A process for preparing 9α-fluoro-12β-hydroxyprogesterone, which comprises interacting 11β,12β-epoxyprogesterone with hydrogen fluoride and recovering the 9α-fluoro-12β-hydroxy steroid formed.

References Cited in the file of this patent

UNITED STATES PATENTS

| | | |
|---|---|---|
| 2,773,076 | Reichstein | Dec. 4, 1956 |
| 2,789,117 | Sarett | Apr. 16, 1957 | thus providing an additional method by which this valuable Friedel-Crafts catalyst can be obtained.

The reaction is conducted in an agitated reactor equipped with a temperature measuring device, an inlet tube and a vented reflux condenser. The apparatus is so arranged that an inert atmosphere is maintained to protect the products from air oxidation.

My invention is further illustrated by the following examples.

*Example I*

An apparatus is assembled comprising a 1 liter flask fitted with an agitator, a thermometer, a gas inlet tube, and a reflux condenser vented to a liquid nitrogen-cooled trap. The flask is immersed in a liquid hydrocarbon bath so that heat can be supplied to, or removed from, the reaction mass as desired. Prior to charging the flask with any of the reactants, the entire system is purged free of air and is maintained under a nitrogen atmosphere throughout the course of the reaction.

Two hundred grams of triisobutylaluminum and 204 grams of dry heptane are charged to the reaction vessel. Over a period of about two hours, 121 grams of boron trichloride gas is added thereto. The boron trichloride supply cylinder is mounted on a balance so that the amount of boron trichloride added to the reaction mixture can be accurately determined. The reaction is exothermic and the temperature is maintained at 55 to 58° C. by means of the cooling bath. After completion of the boron trichloride addition, the reaction mixture is heated at 55° C. for about 15 minutes, at which time a substantial quantity of aluminum chloride begins to precipitate. The liberated heat of fusion causes the temperature to rise to about 92° C. The mixture is cooled to 55° C. and held at that temperature for an additional ¾ hour. The aluminum chloride is then removed by filtration and is washed free of trialkylborane with heptane and dried. A total of 127 grams of aluminum chloride is recovered. The combined filtrate and washings are distilled to remove the heptane. A 162 gram quantity of triisobutylborane, boiling at 39 to 41° C. at 1 mm Hg pressure, is obtained, which represents approximately 88% of theory. The product is contaminated with a small amount of aluminum chloride that is almost impossible to remove completely by distillation. Approximately 13 grams of less volatile residue remains in the distillation flask.

The triisobutylborane thus recovered is placed in a flash under nitrogen atmosphere and 6 grams of triisobutylaluminum is added thereto. The reaction mixture is thereafter distilled and substantially halogen-free triisobutylborane is recovered as a final product. It is more convenient, and therefore preferable, to add the triisobutylaluminum to the combined heptane washings and filtrate before the first distillation step. Using this technique, the residual aluminum chloride can be completely eliminated and the second distillation can be obviated.

*Example II*

Following the general procedure of Example I, 279 grams of triisobutylaluminum and 158 grams of heptane are charged to the reaction vessel. Over a period of 1.5 hours, 167 grams of boron trichloride gas is added thereto. During the addition of the boron trichloride, the temperature rises from 22 to 75° C., where it is maintained. After about 75 to 85% of the boron trichloride is added to the reaction mixture, aluminum chloride begins to precipitate rapidly, causing the temperature to rise to 82° C. After completion of the boron trichloride addition, heating is continued at 70 to 80° C. for 0.5 hour. The precipitated aluminum chloride is then removed by filtration, washed free of triisobutylborane with heptane and dried. A total of 185 grams of aluminum chloride, representing 98.5% of theory, is obtained. The combined filtrate and heptane washings are fractionated. There is obtained 235 grams of triisobutylborane, boiling in the range of 84 to 85° C. at 20 mm. Hg pressure.

*Example III*

The reaction vessel of Example I is charged with 256 grams of tri-n-propylaluminum and 205 grams of heptane. Over a period of 1 hour and 20 minutes 194 grams of boron trichloride gas is added thereto. During the addition of boron trichloride, the temperature rises from 24° C. to 73° C., where it is maintained. Toward the end of the boron trichloride addition, the precipitation of the aluminum chloride causes the temperature to rise momentarily to 81° C. After the addition of the boron trichloride is complete, the reaction mass is heated at 75 to 80° C. for one hour. The precipitated aluminum chloride is removed by filtration, washed free of tri-n-propylborane with heptane, and dried. A 216 gram quantity of substantially pure aluminum chloride, representing 98.8% of theory, is thus obtained. The combined filtrate and heptane washings are fractionally distilled. After removal of the heptane, there is obtained 214 grams of tri-n-propylborane boiling at 60° C. at 19.5 mm. Hg pressure. The yield obtained represents 93% of theory. The tri-n-propylborane is purified as described in Example I.

*Example IV*

Following the procedure of Example I, the reaction vessel is charged with 297 grams of tri-n-butylaluminum and 175 grams of heptane. The reaction vessel and its contents are then heated to 75° C. and 178 grams of boron trichloride gas is added thereto over a period of 1.5 hours. During the addition step the reaction mixture is maintained at 75° C. by cooling or heating as necessary. After the addition of boron trichloride is complete, heating at 75° C. is continued for an additional hour. The precipitated aluminum chloride is removed by filtration and is washed free of tri-n-butylborane and dried. The weight of aluminum chloride thus obtained is 196 grams. An equal volume of oxygen-free water is added to the combined filtrate and heptane washings to wash out the residual aluminum chloride. Distillation of the organic layer gives 270 grams of substantially pure tri-n-butylborane, boiling at 89 to 91° C. at 9 mm. Hg pressure.

*Example V*

Following the procedure of Example I, the reaction vessel is charged with 288 grams of triisoamylaluminum and 200 grams of heptane. The reaction vessel and its contents are heated to 85° C. and 142 grams of boron trichloride is fed thereto over a period of 1.5 hours. The temperature of the reaction mixture is kept at about 85° C. by cooling or heating as necessary. After the addition of boron trichloride is complete, the temperature is held at 85° C. for an additional hour. The precipitated aluminum chloride is removed by filtration, washed free of triisoamylborane with heptane, and dried. The weight of dry aluminum chloride is about 158 grams. The filtrate is washed with water in the manner described in Example IV and triisoamylborane is distilled from the organic layer. There is obtained about 230–240 grams of substantially halogen-free triisoamylborane boiling at 118–119° C at 14 mm. Hg pressure.

*Example VI*

Following the general technique of Example I, the reaction vessel is charged with 296 grams (approximately 1.05 moles) of tri-n-hexylaluminum and 150 grams of heptane. The reaction vessel and its contents are heated to 90° C. and 117 grams (approximately 1 mole) of boron trichloride gas is added thereto over a period of 1.5 hours. The reaction temperature is kept at about 90° C. The slight excess of tri-n-hexylaluminum is used to insure substantially complete conversion of the boron

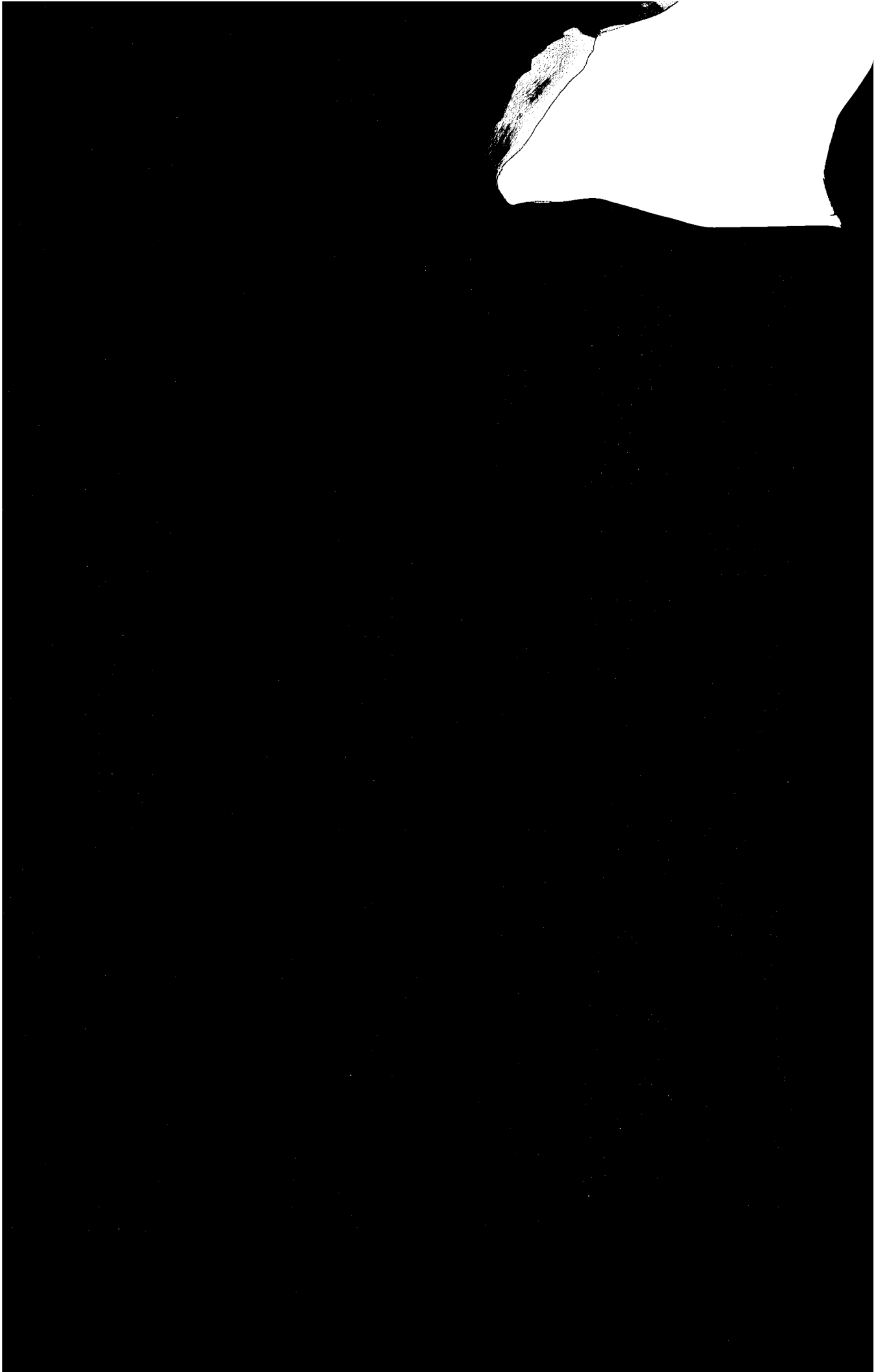

3. Method according to claim 1 wherein said aluminum compound is alkylaluminum dichloride.

4. Method of making trialkylboranes comprising adding boron trichloride to at least about a stoichiometric quantity of trialkylaluminum in the presence of an anhydrous saturated aliphatic hydrocarbon solvent having from 5–12 carbon atoms at a temperature between about 25° C. and below the decomposition temperature of said trialkylaluminum, heating the reaction mixture after the addition of said boron trichloride is complete at an elevated temperature below the melting point of the aluminum chloride formed during the course of the reaction to effect precipitation of at least about 95% of said aluminum chloride, separating said aluminum chloride by filtration and recovering trialkylborane from the filtrate.

5. Method of making trialkylboranes comprising adding boron trichloride to at least about a stoichiometric quantity of trialkylaluminum at a temperature between about 25° C. and below the decomposition of said trialkylaluminum in the presence of an anhydrous saturated aliphatic hydrocarbon solvent having from 5–12 carbon atoms boiling at a temperature of about 25 to 200° C., heating the reaction mixture after the addition of said boron trichloride is complete at an elevated temperature below the melting point of the aluminum chloride formed during the course of the reaction to effect precipitation of at least about 95% of said aluminum chloride, separating said aluminum chloride by filtration and recovering trialkylborane from the filtrate by distillation.

6. Method according to claim 5 wherein substantially halogen-free trialkylborane is obtained by contacting the filtrate with water prior to the recovery of the trialkylborane.

7. Method according to claim 5 wherein substantially halogen-free trialkylborane is obtained by contacting the filtrate with up to about 5%, based upon the weight of product trialkylborane, of trialkylaluminum prior to the recovery of the trialkylborane.

8. Method of making trialkylboranes comprising adding, in an inert atmosphere, boron trichloride to at least about a stoichiometric quantity of trialkylaluminum in the presence of an anhydrous saturated aliphatic hydrocarbon solvent having from 5–12 carbon atoms at a temperature of about 25° C. to 150° C., heating the reaction mixture after the addition of said boron trichloride is complete at said temperature to effect precipitation of at least about 95% of the aluminum chloride formed during the course of the reaction, separating said aluminum chloride by filtration and recovering trialkylborane from the reaction mixture.

9. Method according to claim 8 wherein the alkyl groups of said trialkylaluminum contain from 1 to 20 carbon atoms.

10. Method according to claim 8 wherein said solvent is an acyclic hydrocarbon boiling at a temperature of 25 to 200° C.

11. Method of making trialkylboranes comprising adding, in an inert atmosphere, boron trichloride to at least about a stoichiometric quantity of trialkylaluminum, wherein the alkyl groups contain from 1 to 20 carbon atoms, at a temperature of about 25 to 100° C. in the presence of an anhydrous saturated aliphatic hydrocarbon solvent having from 5–12 carbon atoms boiling at a temperature of about 50 to 200° C., heating the reaction mixture after the addition of said boron trichloride is complete at a temperature of about 50 to 100° C. to effect precipitation of at least about 95% of the aluminum chloride formed during the course of the reaction, separating said aluminum chloride by filtration, contacting the filtrate with water, and recovering substantially halogen-free trialkylborane from the organic layer of the filtrate-water mixture by distillation.

12. Method of making trialkylboranes comprising adding, in an inert atmosphere, boron trichloride to at least about a stoichiometric quantity of trialkylaluminum, wherein the alkyl groups contain from 1 to 20 carbon atoms, at a temperature of about 50 to 100° C. in the presence of an anhydrous saturated aliphatic hydrocarbon solvent having from 5–12 carbon atoms boiling at a temperature of about 50 to 200° C., heating the reaction mixture after the addition of said boron trichloride is complete at a temperature of about 50 to 100° C. to effect precipitation of at least about 95% of the aluminum chloride formed during the course of the reaction, separating said aluminum chloride by filtration, contacting the filtrate with from about 1 to 5%, based on the weight of product trialkylborane, of said trialkylaluminum and recovering substantially halogen-free trialkylborane from the filtrate by distillation.

References Cited in the file of this patent

UNITED STATES PATENTS

| | | |
|---|---|---|
| 2,247,821 | Ruthruff | July 1, 1941 |
| 2,840,590 | Muetterties | June 24, 1958 |

OTHER REFERENCES

Goubeau: F.I.A.T. Reviews of German Science: Inorganic Chemistry, vol. I, pages 215–38 (1948).

Thomas: Anhydrous Aluminum Chloride in Organic Chemistry, Reinhold Publishing Corp., New York, 1941, pp. 787 to 791, 820 and 821.

UNITED STATES PATENT OFFICE
CERTIFICATION OF CORRECTION

Patent No. 3,000,961                             September 19, 1961

Elmer H. Dorbratz

It is hereby certified that error appears in the above numbered patent requiring correction and that the said Letters Patent should read as corrected below.

Column 1, line 26, for "acquiring" read -- requiring --; column 2, line 19, for "trialkylaluminun choride" read -- trialkylaluminum or alkylaluminum chloride --; column 3, line 6, for "products" read -- product --; column 5, line 49, for "flash" read -- flask --.

Signed and sealed this 3rd day of April 1962.

(SEAL)
Attest:

ERNEST W. SWIDER                                       DAVID L. LADD
Attesting Officer                                         Commissioner of Patents